United States Patent [19]

Willette

[11] 4,316,615
[45] Feb. 23, 1982

[54] PICNIC BEACH CART

[76] Inventor: Norval K. Willette, 4 Laurie La., Burlington, Mass. 01803

[21] Appl. No.: 159,189

[22] Filed: Jun. 13, 1980

[51] Int. Cl.³ .............................................. B62B 1/12
[52] U.S. Cl. ............................ 280/47.26; 280/47.18; 280/47.33
[58] Field of Search ............... 280/47.24, 47.26, 47.33, 280/651, 652, 47.18, 47.34

[56] References Cited

U.S. PATENT DOCUMENTS

| 2,672,351 | 3/1954 | Kane | 280/47.34 |
| 3,046,034 | 7/1962 | Herrick | 280/47.24 |
| 3,118,685 | 1/1964 | Jordan | 280/47.26 |
| 3,197,223 | 7/1965 | Dickerson et al. | 280/651 |
| 3,679,227 | 7/1972 | Rock | 280/47.24 |

FOREIGN PATENT DOCUMENTS

| 1070930 | 12/1959 | Fed. Rep. of Germany | 280/47.26 |
| 1148749 | 12/1957 | France | 280/47.33 |
| 1581331 | 9/1969 | France | 280/651 |

Primary Examiner—David M. Mitchell
Assistant Examiner—Ross Weaver
Attorney, Agent, or Firm—E. Thorpe Barrett

[57] ABSTRACT

A beach cart for carrying supplies to and from a beach picnic and for multi-functional use at the picnic site. Of a size to be carried readily in the trunk of a car, the cart has two wide independently-mounted wheels that support the cart near the rear of the bed and beneath the area where an ice chest is to be carried. A removable towing bar has a cross handle that permits the cart to be pulled readily over sandy or rough surfaces. A rotatable stanchion, that locks in the down position, provides, with the wheels, a three point support when the cart is in use as a table or for other purpose. Two folding racks provide support for large articles such as beach chairs or a chaise lounge when the cart is being pulled from auto to the beach site and serve as racks for holding towels or swim suits at the picnic site.

3 Claims, 4 Drawing Figures

PICNIC BEACH CART

BACKGROUND OF THE INVENTION

1. Field of the Invention

This invention relates to a beach cart particularly adapted for multi-functional use by a group visiting a beach for a picnic or other outing.

2. Description of the Prior Art

Although literally millions of people visit beaches each season, most of them suffer the inconvenience of carrying awkward and heavy boxes and packages across the beach and other subsequent inconveniences in carrying out varied activities on the sand beach. Many carts of various shapes, sizes and functions have been devised, but none provides the features necessary for a practical beach cart. The requirements are demanding: A first requirement is cost. Because most families will make use of a beach cart on an irregular basis, the cart must be so designed that it can be manufactured readily from low cost materials and so retail at a price well within the budget of the typical beach-visiting family. But even within such a cost limitation, the cart must be compact when not in use so that it will take minimum space when stored or carried in the trunk of a car; it must be capable of easily transporting relatively heavy loads over sandy and uneven surfaces; and it must be capable of multi-functional use once in place at the picnic site.

SUMMARY OF THE INVENTION

The invention is embodied in a picnic beach cart having a bed supported by a pair of independently-mounted wide-tread wheels positioned so as to be directly under an ice-cooled chest near the rear of the bed, a removable towing bar adapted to be pulled by two people, a rotatable T-stanchion for stabilizing the bed for use as a table, and retractable frames serving during transport as a support for large articles, such as beach chairs or lounges, and as racks for towels, swim suits and the like when in position on the beach. These and other features of the invention will be apparent from the following description.

DESCRIPTION OF THE PREFERRED EMBODIMENT

Figure 1:
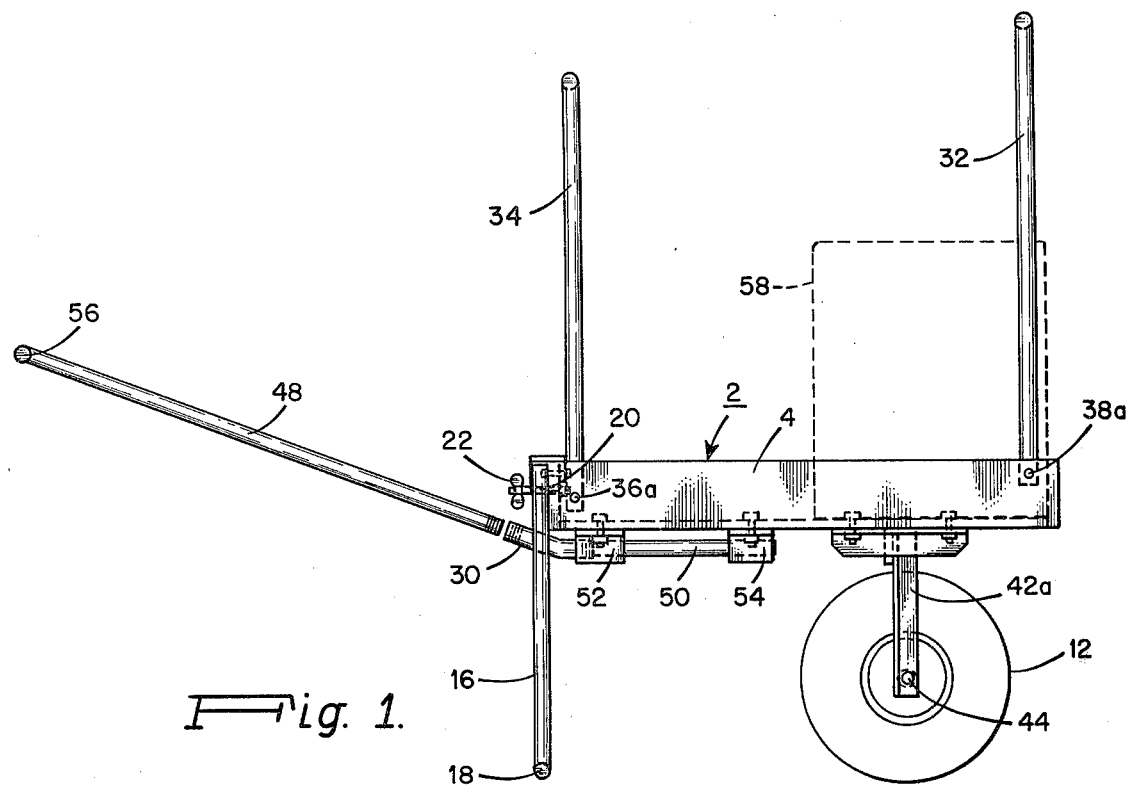
FIG. 1 is a side view of the beach cart as used at the picnic site, the towing handle being shown detached from the bed of the cart.

The picnic beach cart includes a bed, generally indicated at 2, having upwardly extending peripheral sides 4, 6, 8, and 10. The bed 2 should be small enough to be carried in the trunk of a car, yet large enough to carry an ice chest and other necessary supplies. I find a bed about 26 inches wide and 22 inches deep with sides about three inches high to be entirely suitable. The front-to-rear dimension is preferably between 18 and 26 inches and the width between 26 and 36 inches. The bed may be formed from any desired material, but I prefer it to be molded or pressed in one piece from light-weight inexpensive plastic. Alternatively, it may be stamped, either as a single unit or in separate parts for subsequent assembly, from steel or aluminum.

The bed 2 is supported, when in stationary position, by two wheels 12 and 14 and a T-shaped stanchion 16 having an integral cross bar 18 at its lower end. This tripod arrangement provides a simple and stable support for the bed 2 so that it can serve as a table for eating or as a support for relatively heavy objects that need not be positioned carefully within the bed. To this end, the wheels 12 and 14 are mounted near the opposite edges of the bed 2 to provide lateral stability and near the rear of the bed 2 to provide, in conjunction with the stanchion 16, front-to-rear stability.

Figure 3:
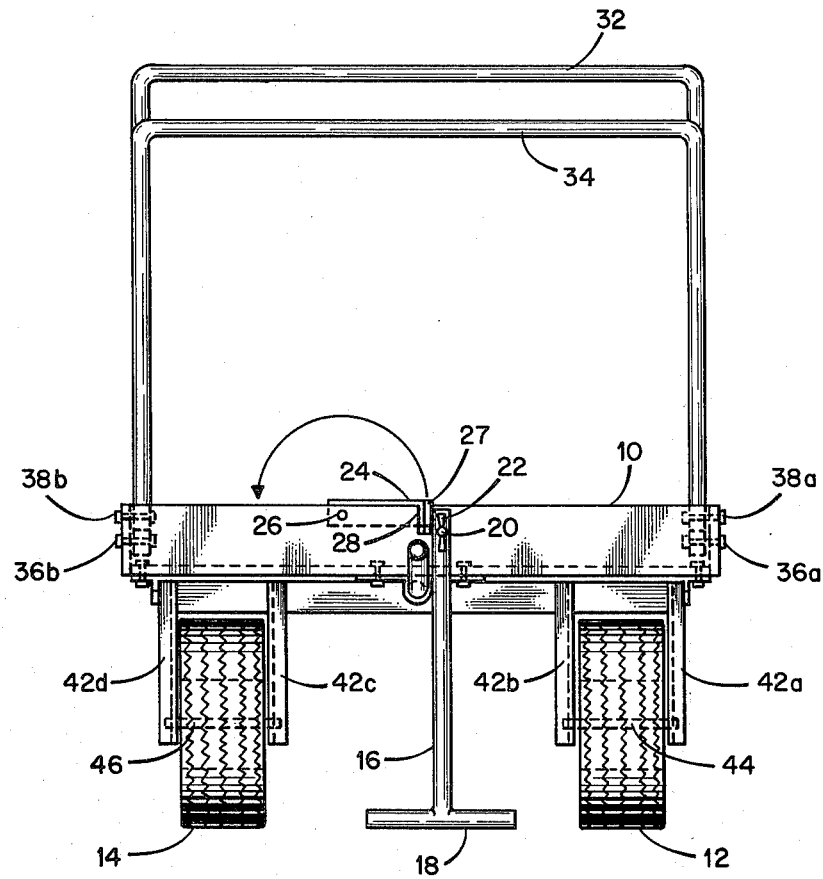
FIG. 3 is a front view of cart showing the stabilizing T-stanchion locked in its down position.

The stanchion 16 is pivotally secured to the front side 10 of the bed 2 by a bolt 20 that extends through the stanchion 16 and side 10 and is secured by a wing nut 22. To lock the stanchion in the down position, an L-shaped steel locking plate 24 is pivotally secured by a screw 26 to the inner surface of the side 10. A perpendicular extension 27 of the plate 24 extends through a slot 28 in the side 10 and forwardly of the side 10 immediately adjacent the upper end of the stanchion 16 above the pivot bolt 20 as shown in FIG. 3. The end of the locking plate 24 thereby prevents counter-clockwise rotation of the stanchion 16 as viewed in FIG. 3.

Rotation of the stanchion 16 in the opposite direction is prevented by a fixed member that serves as a towing-bar coupling 30 to be described presently. The stanchion 16 is thus firmly locked in its vertical position with the bed 2 further stabilized by the cross-bar 18 resting on the beach sand or other supporting surface.

Figure 4:
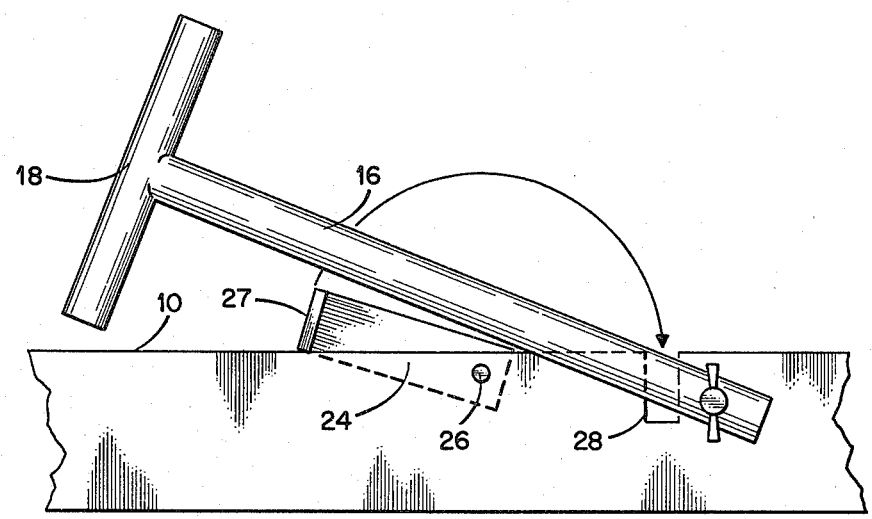
FIG. 4 is an enlarged partial front view showing the T-stanchion in position for transport.

When the cart is to be moved from one location to another, it is only necessary to swing the locking plate out of the slot 28 and rotate the stanchion 16 to the position shown in FIG. 4. The stanchion 16 is readily removed for storage by removing the wing nut 22, but such removal is not necessary merely to move the cart from one location to another. Alternatively, for storing or for other purpose, the wing nut 22 may be tightened to lock the stanchion in any intermediate position.

To provide a convenient rack for hanging towels or swim suits and for other uses, two identical U-shaped tubular frames 32 and 34, of plastic or aluminum, are pivotally supported by the sides 4 and 8 at the rear and forward ends of the cart respectively. The frame 34 is secured to the sides 4 and 8 by bolts 36a and 36b at points near the base of the sides 4 and 8 so that the frame 34 can be rotated clockwise, as viewed in FIG. 1, and rest directly on the upper surface of the cart bed 2. The frame 32 is pivotally supported by bolts 38a and 38b on the sides 4 and 8 at points nearer the top edges of the sides 4 and 8 so that, when folded down by counter-clockwise movement as viewed in FIG. 1, the frame 32 rests directly on top of the frame 34. The frames 32 and 34 serve the additional function of supporting larger items for transport between car and beach. For example, items such as a chaise lounge or folding chairs may be placed lengthwise on top of the frames 32 and 34 and secured to them by elastic ropes or the like.

The wheels 12 and 14 have flat rim tread surfaces three to four inches wide so that the cart can be pulled easily over sandy surfaces. The diameters of the wheels are eight to ten inches to minimize storage space requirements and so that the bed is at a convenient height for use by people seated on the beach. Preferably the lower surface of the bed 2 should be at a height between 9 and 18 inches above the ground.

To provide support for the wheels, a length of angle iron 40 extends transversely across the bottom of the bed 2 and is secured to it by bolts or other means (not shown). Axle-support members 42a, 42b, 42c, and 42d, formed of angle iron, are secured to and extend downwardly from the angle iron 40. The wheel 12 is mounted on an axle 44 extending between axle supports 42a and 42b, and wheel 14 is similarly mounted on an axle 46 extending between axle supports 42c and 42d. This independent mounting arrangement eliminates the need for an axle extending between the two wheels and provides maximum clearance for moving the cart over rough terrain.

Figure 2:
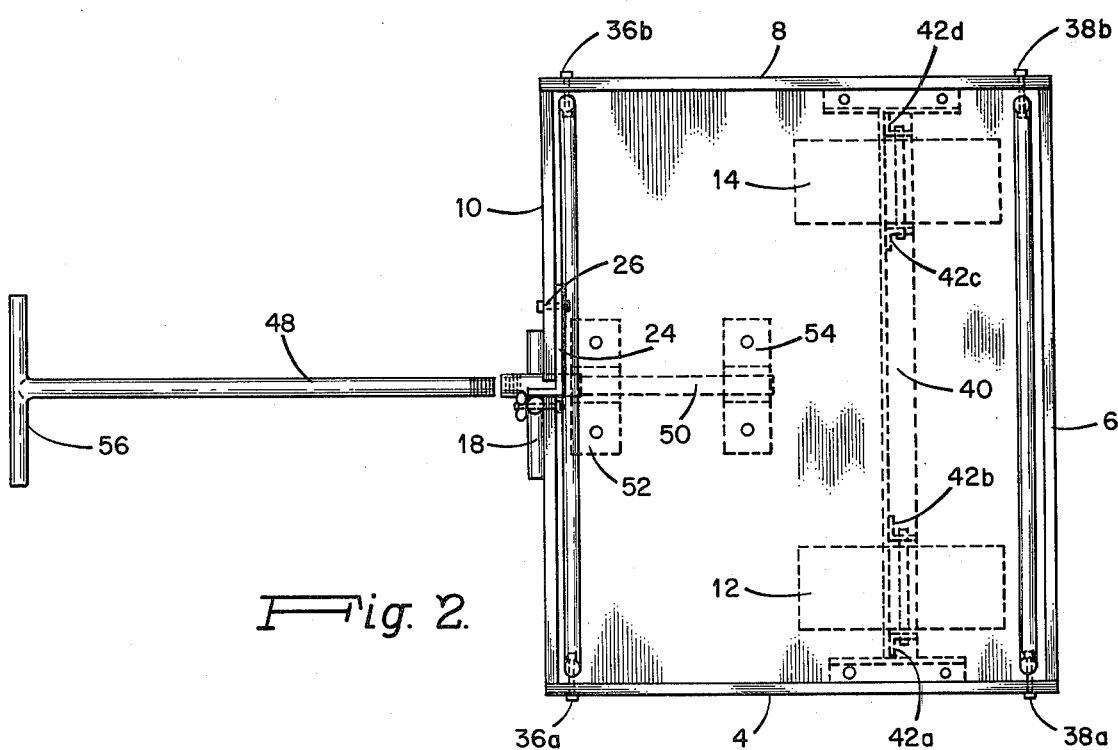
FIG. 2 is a plan view of the cart as shown in FIG. 1.

To transport the cart from place to place, a towing bar 48 (shown detached in FIGS. 1 and 2) is removably secured to the coupling 30. A convenient mounting arrangement for the towing bar consists of a length of iron pipe 50 secured by cleats 52 and 54, or other suitable means, to the underside of the bed 2. This pipe is bent, for example at an angle of 20 to 30 degrees, so that the forward end of the pipe extends upwardly as illustrated in FIG. 1. The coupling 30, which has internal threads at each end, is threaded onto the pipe 50 and receives a threaded end of the towing bar 48. The outer end of the bar 48 is provided with a handle 56 that is welded to the end of the bar 48 and extends at right angles from each side of it. This handle construction is advantageous because it permits the cart to be pulled easily by two people walking side by side and provides leverage for removing the towing bar from the coupling 30 for auto transport or storage.

One of the most usual items carried on a beach picnic is an ice-cooled chest for food and beverage. Such a chest, with the ice and liquid, represents a relatively large part of the weight that must be transported. To facilitate the transport of such a chest, illustrated in broken lines at 58 in FIG. 1, the distance from the wheel axles 44 and 46 to the rear of the bed 2 is such that when a typically loaded cooler is positioned across the rear of the bed 2, the cart is substantially balanced over the axles. A distance between 5 and 10 inches from the axles to the rear of the bed 2 is practical, with 7 inches being the preferred dimension. With this arrangement of the primary load directly over the two wheels, the cart can be towed with minimum effort.

From the foregoing it will be seen that my invention provides a beach cart that economically attains the ends and objects set forth herein, that can be manufactured from readily obtainable materials with only the use of conventional fabrication techniques, and is subject to a variety of modifications within the scope of the following claims.

I claim:
1. A beach cart including
first and second wheels each having an axle and an annular rim tread surface of substantial width in a circular plane parallel with the longitudinal axis of its axle,
a horizontal flat bed having upwardly-extending peripheral side walls,
means independently mounting said wheels on the underside of said bed near opposite sides thereof and arranged to support said bed at a distance between nine and eighteen inches above the lowest surface of said wheels, said axles being positioned along a line within ten inches from a vertical plane passing through the rear edge of said bed,
a support stanchion,
means rotatably securing said stanchion to the front of said bed,
releasable locking means arranged to secure said stanchion in its vertical position whereby said bed is supported by a tripod formed by said stanchion and said wheels,
a towing bar removably secured to said bed, and
a fixed stop member secured to said bed and positioned to abut said stanchion and thereby limit the rotational movement thereof in a first direction,
said locking means including a rotatable member having a first position in which it engages said stanchion and prevents rotational movement thereof in a direction opposite from said first direction,
one of said sidewalls including a slot extending downwardly from its upper edge, and
said rotatable member including an extension that, when said rotatable member is in its first position, extends through said slot and projects forwardly thereof to abut one side of said stanchion.
2. A beach cart as claimed in claim 1 wherein
said stanchion includes a cross-bar at its outer end adapted to increase the stability of said cart, and
said towing bar includes a handle extending laterally on each side thereof whereby the cart can be readily pulled by two people walking side by side.
3. A beach cart as claimed in claim 2 including
first and second generally U-shaped racks,
means rotatably securing the end portions of said first rack to said side walls near the front of said bed, and
means rotatably securing the end portions of said second rack to said side walls near the rear of said bed.

* * * * *